(12) United States Patent
Park et al.

(10) Patent No.: US 12,537,176 B2
(45) Date of Patent: Jan. 27, 2026

(54) PLASMA DIAGNOSTIC APPARATUS AND OPERATING METHOD THEREOF

(71) Applicant: Samsung Electronics Co., Ltd., Suwon-si (KR)

(72) Inventors: Haewook Park, Suwon-si (KR); Juhyun Kim, Suwon-si (KR); Younsok Choi, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 284 days.

(21) Appl. No.: 18/351,242

(22) Filed: Jul. 12, 2023

(65) Prior Publication Data

US 2024/0242944 A1   Jul. 18, 2024

(30) Foreign Application Priority Data

Jan. 18, 2023   (KR) .......................... 10-2023-0007523

(51) Int. Cl.
  *H01J 37/32*   (2006.01)
  *G01R 1/07*   (2006.01)
(52) U.S. Cl.
  CPC ........ *H01J 37/32917* (2013.01); *G01R 1/072* (2013.01); *H01J 37/32935* (2013.01); *H01J 2237/24564* (2013.01)
(58) Field of Classification Search
  CPC ........... H01J 37/32917; H01J 37/32935; H01J 2237/24564; G01R 1/072
  See application file for complete search history.

(56) References Cited

U.S. PATENT DOCUMENTS

| | | | | | |
|---|---|---|---|---|---|
| 5,314,603 | A | * | 5/1994 | Sugiyama | H01J 37/32935 156/345.47 |
| 5,571,366 | A | * | 11/1996 | Ishii | H01J 37/3299 216/60 |
| 5,808,415 | A | * | 9/1998 | Hopkins | G01R 19/0061 324/95 |

(Continued)

FOREIGN PATENT DOCUMENTS

| | | |
|---|---|---|
| KR | 10-2007-0048577 A | 5/2007 |
| KR | 10-1116002 B1 | 4/2011 |

(Continued)

OTHER PUBLICATIONS

Coherent Sampling vs Window Sampling, Maxim Integrated https://www.analog.com/en/resources/technical-articles/coherent-sampling-vs-window-sampling.html (Year: 2002).*

(Continued)

*Primary Examiner* — Steven L Yeninas
(74) *Attorney, Agent, or Firm* — Harness, Dickey & Pierce, P.L.C.

(57) ABSTRACT

A plasma diagnostic apparatus includes a substrate having at least one probe, a plasma diagnostic circuit mounted on the substrate, configured to diagnose plasma in a chamber with the at least one probe, and to store diagnosis result information, a wireless communication circuit mounted on the substrate and configured to wirelessly transmit the diagnosis result information to an external device, and a battery mounted on the substrate and configured to supply power to the plasma diagnostic circuit and to the wireless communication circuit.

19 Claims, 10 Drawing Sheets

(56) References Cited

U.S. PATENT DOCUMENTS

| | | | | |
|---|---|---|---|---|
| 6,313,583 B1* | 11/2001 | Arita | ................. | H01J 37/32174 |
| | | | | 315/111.21 |
| 6,553,277 B1* | 4/2003 | Yagisawa | ................ | H01L 22/34 |
| | | | | 700/121 |
| 8,264,237 B2 | 9/2012 | Coumou | | |
| 8,889,021 B2* | 11/2014 | Jensen | .............. | H01J 37/32935 |
| | | | | 216/61 |
| 2002/0135378 A1* | 9/2002 | Coumou | .......... | H01J 37/32935 |
| | | | | 324/464 |
| 2004/0007326 A1* | 1/2004 | Roche | ............... | H01J 37/32935 |
| | | | | 118/712 |
| 2005/0011611 A1* | 1/2005 | Mahoney | .......... | H01J 37/32935 |
| | | | | 156/345.24 |
| 2008/0265903 A1* | 10/2008 | Chung | ................. | H05H 1/0081 |
| | | | | 324/464 |
| 2010/0282711 A1* | 11/2010 | Chung | .............. | H01J 37/32935 |
| | | | | 118/712 |
| 2013/0006555 A1 | 1/2013 | Roberg et al. | | |
| 2014/0253092 A1* | 9/2014 | Jeon | ................. | H01J 37/32954 |
| | | | | 324/71.1 |
| 2015/0276833 A1 | 10/2015 | Scullin et al. | | |
| 2019/0057887 A1* | 2/2019 | Ballandras | ............. | G01D 5/48 |
| 2023/0141012 A1* | 5/2023 | Achkasov | ......... | H01L 21/67276 |
| | | | | 438/14 |
| 2024/0021420 A1* | 1/2024 | Kwon | ............... | H01J 37/32917 |
| 2024/0035896 A1* | 2/2024 | Lin | .................... | H01J 37/32917 |
| 2024/0096608 A1* | 3/2024 | Teruuchi | .......... | H01J 37/32935 |
| 2024/0170258 A1* | 5/2024 | Tamamushi | ............. | H05H 1/46 |
| 2024/0177965 A1* | 5/2024 | Gahan | ............... | H01J 37/32935 |
| 2024/0280631 A1* | 8/2024 | Yamakaji | ........... | G01R 31/2874 |
| 2024/0312765 A1* | 9/2024 | Lee | ..................... | H01J 37/3299 |
| 2024/0429034 A1* | 12/2024 | Kim | .................. | H01J 37/32935 |

FOREIGN PATENT DOCUMENTS

| | | |
|---|---|---|
| KR | 10-1197828 B1 | 8/2011 |
| KR | 10-1447639 B1 | 10/2014 |
| WO | WO-2019/235690 A1 | 12/2019 |

OTHER PUBLICATIONS

Se-Jin Oh, et al. "Double probe diagnostics based on harmonic current detection for electron temperature and electropositive ion flux measurement in RF plasmas," IOPSCIENCE, Paper Measurement Methods and Practical Developments, vol. 23, No. 8, (2012).

Jin-Yong Kim, et al. "Wireless wafer-type probe system for measurement of two-dimensional plasma parameters and spatial uniformity," IOPSCIENCE, Measurement Science and Technology, vol. 24, No. 9, (2013).

* cited by examiner

PLASMA DIAGNOSTIC APPARATUS AND OPERATING METHOD THEREOF

CROSS-REFERENCE TO RELATED APPLICATION(S)

This application claims the benefit under 35 USC 119(a) of Korean Patent Application No. 10-2023-0007523 filed on Jan. 18, 2023 in the Korean Intellectual Property Office, the entire disclosure of which is incorporated herein by reference for all purposes.

BACKGROUND

Various example embodiments relate to a plasma diagnostic apparatus and/or a method of operating the same.

In general, methods for measuring and characterizing plasma variables can be broadly categorized into electrical and optical methods. Electrical methods can be divided into Langmuir probes, microwave probes, and other measurement probes (such as Mach probes, emissive probes, ion energy measurement probes, etc.). Langmuir probes can be further classified into single, double, triple, and so on, depending on the probe's structure. Microwave probes encompass cutoff, hairpin, oscillation measurements, among others. Optical methods may include a light emission diagnostic method that measures the light emitted from the plasma, and an optical absorption diagnostic method that analyzes the light absorbed by the plasma. Although plasma parameters are not measured directly, there are methods for monitoring light emission signals to detect process anomalies or determine process end time points, as well as monitoring power system signal measurements such as voltage, current, phase, self-bias voltage, power, and the capacitor value of the matching network.

SUMMARY

Various example embodiments provide a plasma diagnostic apparatus of diagnosing plasma in situ, and a method of operating the same.

According to some example embodiments, a plasma diagnostic apparatus includes a substrate having at least one probe; a plasma diagnostic circuit mounted on the substrate, configured to diagnose plasma in a chamber with the at least one probe, and configured to process and store diagnosis result information; a wireless communication circuit mounted on the substrate and configured to wirelessly transmit the diagnosis result information to an external device; and a battery mounted on the substrate and configured to supply power to the plasma diagnostic circuit and the wireless communication circuit.

Alternatively or additionally according to some example embodiments, a method of operating a plasma diagnostic apparatus implemented in a wafer form includes generating an electrical signal in a signal generator mounted on a substrate; applying the generated electrical signal to at least one probe; receiving an electrical signal from the at least one probe in a plasma diagnostic circuit mounted on the substrate; and analyzing the received electrical signal using at least one of coherent sampling or a window function in the plasma diagnostic circuit that is mounted on the substrate.

Alternatively or additionally according to some example embodiments, a plasma diagnostic apparatus includes a substrate implemented as a wafer; a plurality of probes on the substrate; and a plasma diagnostic circuit configured to receive an electrical signal corresponding to plasma of a chamber through each of the plurality of probes and to diagnose the electrical signal through coherent sampling or a window function.

BRIEF DESCRIPTION OF DRAWINGS

The above and other aspects, features, and advantages according to an example embodiment will be more clearly understood from the following detailed description, taken in conjunction with the accompanying drawings, in which.

DETAILED DESCRIPTION

Hereinafter, various example embodiments will be described with reference to the accompanying drawings.

In general, a streamlined Langmuir probe or cutoff probe may be used for plasma diagnosis of the facility environment. However, this plasma diagnosis method requires regular preventive maintenance (PM) of the facility, which is both time-consuming and human-power-intensive. Moreover, inserting a streamlined probe through a narrow viewport may be cumbersome. Alternatively or additionally there may also be discrepancies between the plasma diagnosis results obtained by inserting an existing probe through the viewport and the process results on the upper surface of the wafer. As a result, there is a growing demand for a wireless, in-situ plasma diagnostic apparatus that can diagnose plasma on the upper surface of a wafer and can be auto-loaded through a Front Opening Unified Pod (FOUP) without the need for or with a reduced need for preventive maintenance work.

In the in-situ plasma diagnostic apparatus and operating method thereof according to various example embodiments, when diagnosing plasma through the application of coherent sampling and/or window functions, the required or used power consumption may be reduced by increasing the Signal-to-Noise Ratio (SNR) in the frequency domain. This may be implemented using a longer battery life, utilizing a thin and compact battery, and low-power devices. As a result, the in-situ plasma diagnostic apparatus and/or the operating method according to some example embodiments may enhance the sensitivity of plasma diagnosis while significantly reducing the computational burden on the plasma diagnosis technique. There may be an improvement in characterization of plasma properties, which may lead to an improved semiconductor manufacturing process.

Figure 1A:
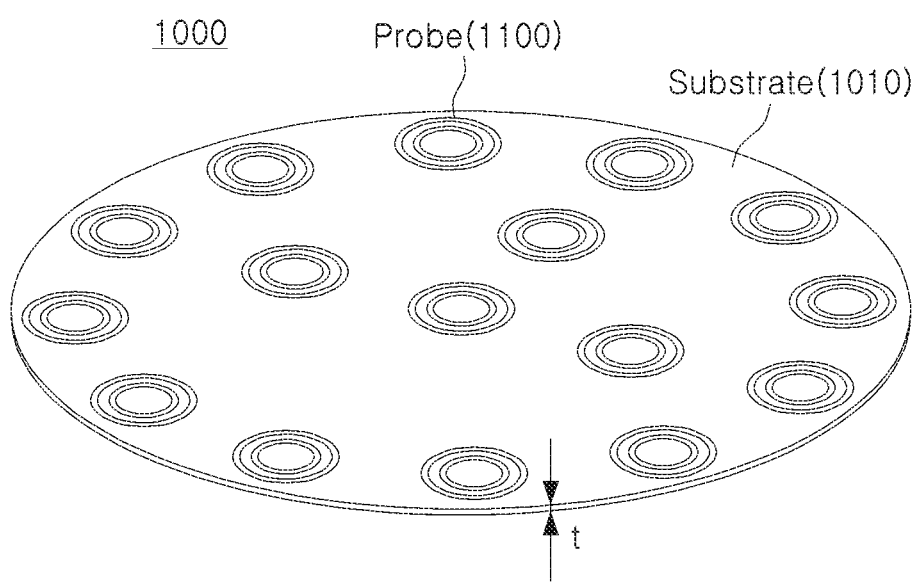
FIGS. 1A and 1B are diagrams illustrating a plasma diagnostic apparatus 1000 according to some example embodiments by way of example.
Figure 1B:
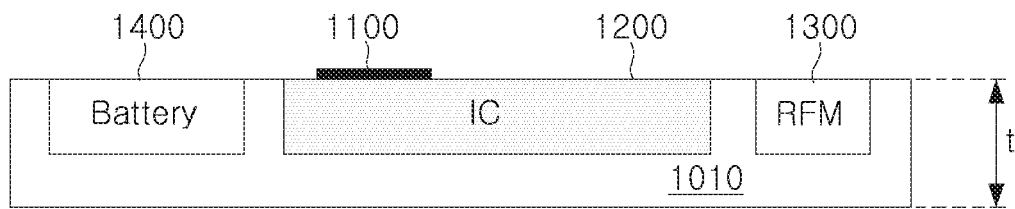

FIGS. 1A and 1B are diagrams illustrating a plasma diagnostic apparatus 1000 according to some example embodiments by way of example. Referring to FIGS. 1A and 1B, the plasma diagnostic apparatus 1000 may be implemented to perform wireless type in-situ process plasma diagnosis.

As illustrated in FIG. 1A, the plasma diagnostic apparatus 1000 may be implemented in a wafer form capable of auto-loading from or to a FOUP. In this case, the plasma diagnostic apparatus 1000 may have a thickness t. The plasma diagnostic apparatus 1000 may include at least one probe 1100 on or sitting on or attached to a substrate 1010. In this case, the substrate 1010 may be or may include or may correspond to a silicon (Si) substrate, such as but not limited to a 300 mm Si substrate. On the other hand, it should be understood that the material of the substrate 1010 is not limited to Si. In some example embodiments, the probe 1100 may be implemented in the form of a double probe.

Referring to FIG. 1B, the plasma diagnostic apparatus 1000 may include a plasma diagnostic circuit (IC) 1200 mounted on or at least partly mounted on or at least partly embedded in the substrate 1010, a radio communication circuit (RFM) 1300 mounted on or at least partly mounted or at least partly embedded in the substrate 1010, and a battery 1400 mounted on or at least partly mounted or at least partly embedded in the substrate 1010.

The plasma diagnostic circuit (IC) 1200 may detect an electrical signal through at least one probe 1100, and may diagnose plasma through application of coherent sampling or a window function. The plasma diagnostic circuit 1200 may significantly reduce battery capacity by 50 times or more, compared to existing battery capacity (e.g., 1000 milliamp-hour (mAh)→20 mAh) by obtaining low power consumption. Since the battery capacity is reduced, the use of a thin battery 1400 is possible. In addition, the thickness t of the plasma diagnostic circuit 1200 may be significantly reduced by using a low-power Integrated Circuit (IC) that may be reduced in size, e.g., may be miniaturized. In some example embodiments, the process plasma diagnostic apparatus 1000 may be implemented to have a thickness less than 3.0 mm. In some example embodiments, the process plasma diagnostic apparatus 1000 may have a thickness of about 750 microns, which may be the same as a standard 300 mm wafer; however, example embodiments are not limited thereto. In some example embodiments, the weight of the process plasma diagnostic apparatus 1000 may be less than 400 g. In some example embodiments, the weight of the process plasma diagnostic apparatus 1000 may be about 125 grams or more, which may be the same as or more than a weight of a standard 300 mm silicon wafer; however, example embodiments are not limited thereto. In some example embodiments, a diameter of the process plasma diagnostic apparatus 1000 may be 300 mm; however, example embodiments are not limited thereto.

The radio communication circuit (RFM) 1300 may be implemented to perform wireless communication with an external device. In this case, wireless communication may use one or more various forms including RF communication. The wireless communication circuit 1300 may receive a request for a diagnosis result of the plasma diagnostic circuit 1200 from an external device and/or may transmit a diagnosis result of the plasma diagnostic circuit 1200 to an external device.

The battery 1400 may be implemented to supply required power to the plasma diagnostic circuit 1200 and the wireless communication circuit 1300.

In some example embodiments, the plasma diagnostic apparatus 1000 according to some example embodiments is capable of chucking using an electrostatic chuck (ESC) using Si material. Plasma diagnosis is possible under the same chucking conditions in which actual wafers, such as actual 300 mm wafers are processed. Alternatively or additionally, since the plasma diagnostic apparatus 1000 according to some example embodiments is formed of the same as the material used in the actual process, the plasma diagnostic apparatus may be more robust against chamber contamination issues such as particles before and/or after process diagnosis.

The plasma diagnostic apparatus 1000 according to some example embodiments may be implemented in a Si material-based thin design, and may diagnose plasma parameters such as at least one of electron temperature, ion density, and ion flux of plasma through the wireless probe 1100 in situ. Accordingly, since in-situ diagnosis of plasma is possible without or with a reduced need for preventive maintenance (PM) work such as chamber opening, manpower operation and management costs of the facility may be significantly reduced.

Additionally or alternatively, the plasma diagnostic apparatus 1000 according to some example embodiments may help to sufficiently secure a ratio between a required frequency signal and a non-required frequency signal without increasing the sampling frequency and/or without using a relatively large number of samples for frequency analysis during plasma diagnosis, and may thus measure a plasma signal more sensitively. Alternatively or additionally, the plasma diagnostic apparatus 1000 according to some example embodiments may provide excellent performance even when a sampling frequency is lowered in plasma diagnosis or the number of samples used in frequency analysis is reduced, and battery power consumption may be reduced by reducing the calculation burden of the sensor.

Since the plasma diagnostic apparatus 1000 according to some example embodiments uses a thin and small battery 1400 and an IC 1200, developing a thin and light wireless type in-situ plasma diagnosis sensor may be possible. Alternatively or additionally, the plasma diagnostic apparatus 1000 according to some example embodiments may improve the implementation accuracy of a function algorithm that stores only peaks in the frequency domain when the Signal-to-Noise Ratio (SNR) of the frequency analysis result is improved. Accordingly, the plasma diagnostic apparatus 1000 according to some example embodiments of various example embodiments may further speed up data processing, eliminate the need to secure unwanted frequency data storage space, and significantly extend the lifespan of the sensor. In some example embodiments, a result of diagnosis form the plasma diagnostic apparatus 1000 may be used to improve and/or modify a plasma process, so as to improve and/or modify a fabrication process such as but not limited to a chemical vapor deposition (CVD) process and/or a dry etching process.

Figure 2:
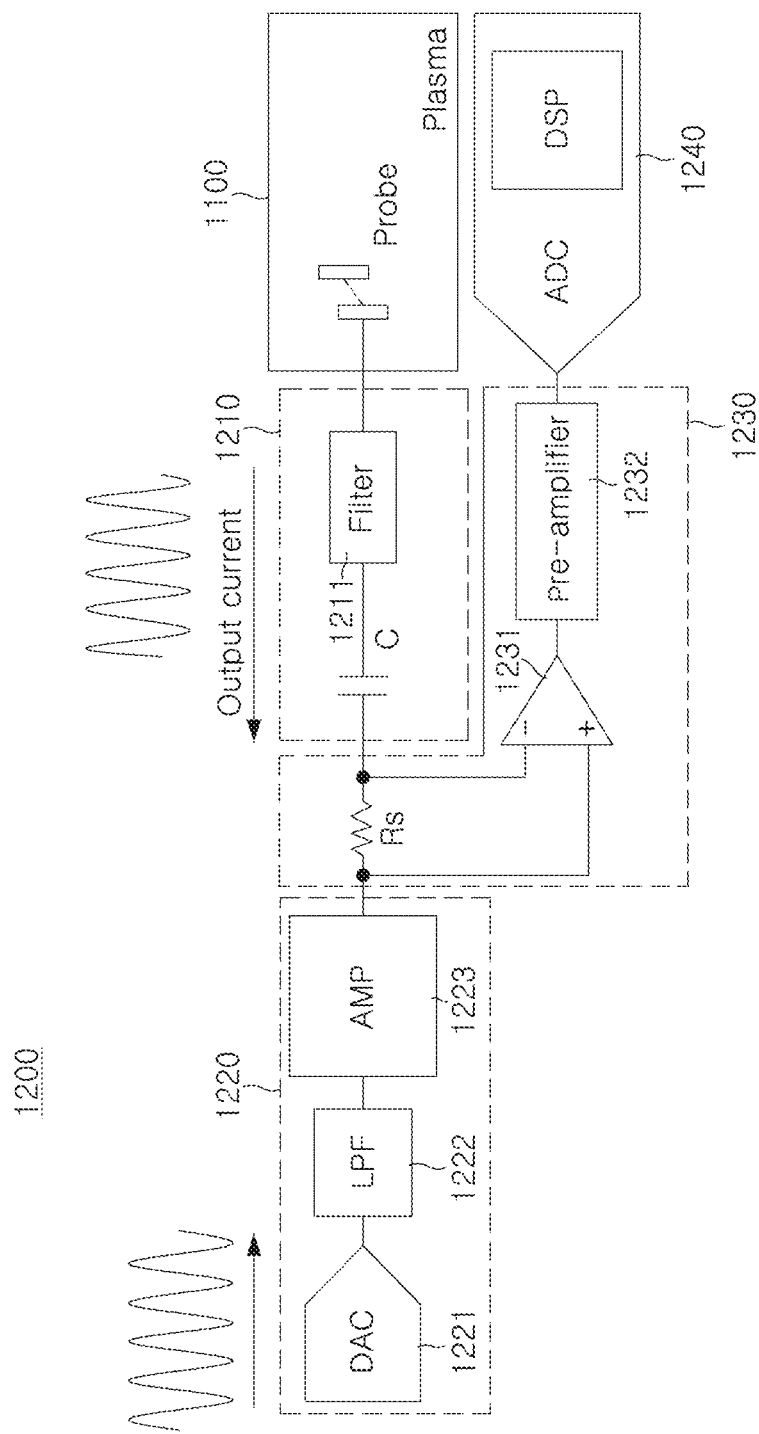
FIG. 2 is a diagram illustrating a plasma diagnostic circuit 1200 according to some example embodiments by way of example.

FIG. 2 is a diagram illustrating a plasma diagnostic circuit 1200 according to some example embodiments by way of example. The plasma diagnostic circuit 1200 may periodically supply an electrical signal to the probe 1100 inserted into the space where plasma is generated, receive the electrical signal coming from the plasma, and detect an output signal by applying coherent sampling or a window function.

Referring to FIG. 2, the plasma diagnostic circuit 1200 may include a probe circuit 1210, a signal generator 1220, a signal receiver 1230, and a signal processing circuit 1240.

The probe circuit 1210 may be implemented to be inserted into a chamber, such as a CVD chamber or a dry etch chamber or plasma-assisted ion implantation chamber, where process plasma is generated, may transmit a periodic electrical signal formed from the signal generator 1220 to the plasma, and may receive an electrical signal received from the plasma. The probe circuit 1210 may include a capacitor C connected to the probe 1110. The probe circuit 1210 may further include a filter 1211 performing a filter function to prevent noise from entering the chamber. The probe circuit 1210 may further include a capacitor for AC coupling with the signal processing circuit 1240.

The signal generator 1220 may be implemented to generate periodic signals using one or more of an oscillator, a voltage generator, a function generator, a digital-to-analog converter, and the like. The signal generator 1220 may further include a filter 1222 and an amplifier 1223 for amplification to improve the quality of the supplied signal. The signal generator 1220 may include a digital-to-analog converter (DAC) 1221, a low-pass filter (LPF) 1222, and an amplifier (AMP) 1223.

The signal receiver 1230 may be implemented to receive the electric signal received from the probe circuit 1210. The signal receiver 1230 may include a resistor Rs and an operational amplifier 1231 for measuring electrical signals. The signal receiver 1230 may further include a pre-amplifier 1232 that electrically pre-processes the chamber generating plasma and the measurement system. The signal receiver 1230 may include a filter function capable of selectively adjusting a bandwidth to prevent or mitigate or reduce sampling distortion of the signal processing circuit 1240. The pre-amplifier (1232; with Anti-aliasing Filter) may implement a filter function that selectively adjusts the bandwidth and signal level to prevent or mitigate or reduce distortion of the signal to be sampled in analog and/or digital form using passive and/or active elements. In some example embodiments, a function of adjusting the common-mode level and magnitude of the signal applied to the signal processing circuit 1240 may be included.

The signal processing circuit 1240 may be implemented to perform sampling by analyzing the signal received from the signal receiver 1230 in a frequency band by applying coherent sampling or a window function. The signal processing circuit 1240 may receive a plasma electrical signal with low power by increasing the Signal-to-Noise Ratio (SNR) of the electrical signal.

Coherent sampling is as follows. Spectral leakage may be prevented or reduced when the frequency ($f_{signal}$) of the supplied signal and the frequency ($f_{sampling}$) of sampling the signal satisfy the coherent sampling condition as illustrated in Equation 1 to perform frequency analysis.

$$\frac{f_{signal}}{f_{sampling}} = \frac{M}{N} \quad \text{[Equation 1]}$$

In Equation 1, M and N are positive integers that are coprime, and N may be expressed as a power of 2.

In some example embodiments, when N elements generating frequencies are included (where N is a positive integer greater than or equal to 1), each frequency satisfies Equation 2 and the frequency ($f_{sampling}$) for sampling the signal ($f_{i \in A}$, A=1, 2, 3, . . . N). Accordingly, spectral leakage may be prevented or reduced as a result of frequency analysis at a required frequency.

$$\frac{f_{i \in A}}{f_{sampling}} = \frac{P}{Q} \quad \text{[Equation 2]}$$

In Equation 2, i is an element that generates different frequencies, A is a finite set including N elements that generate frequencies, P and Q are positive integers that are respectively coprime, and Q may be expressed as a power of 2.

In addition, the window function may increase the signal-to-noise ratio of the frequency analysis result by analogically or digitally applying the function to the sampled signal. In addition, the data processing function (fast Fourier transform (FFT) Peak Detection) may include an algorithm for selectively storing only a required or used peak value of a plasma frequency signal with respect to the frequency analysis operation result in a storage device.

Figure 3A:
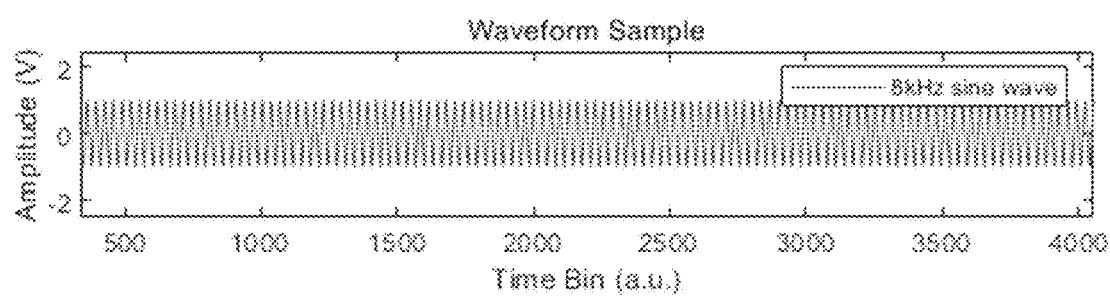
FIGS. 3A and 3B are diagrams illustrating frequency analysis results of the plasma diagnostic circuit 1200 according to some example embodiments by way of example.
Figure 3B:
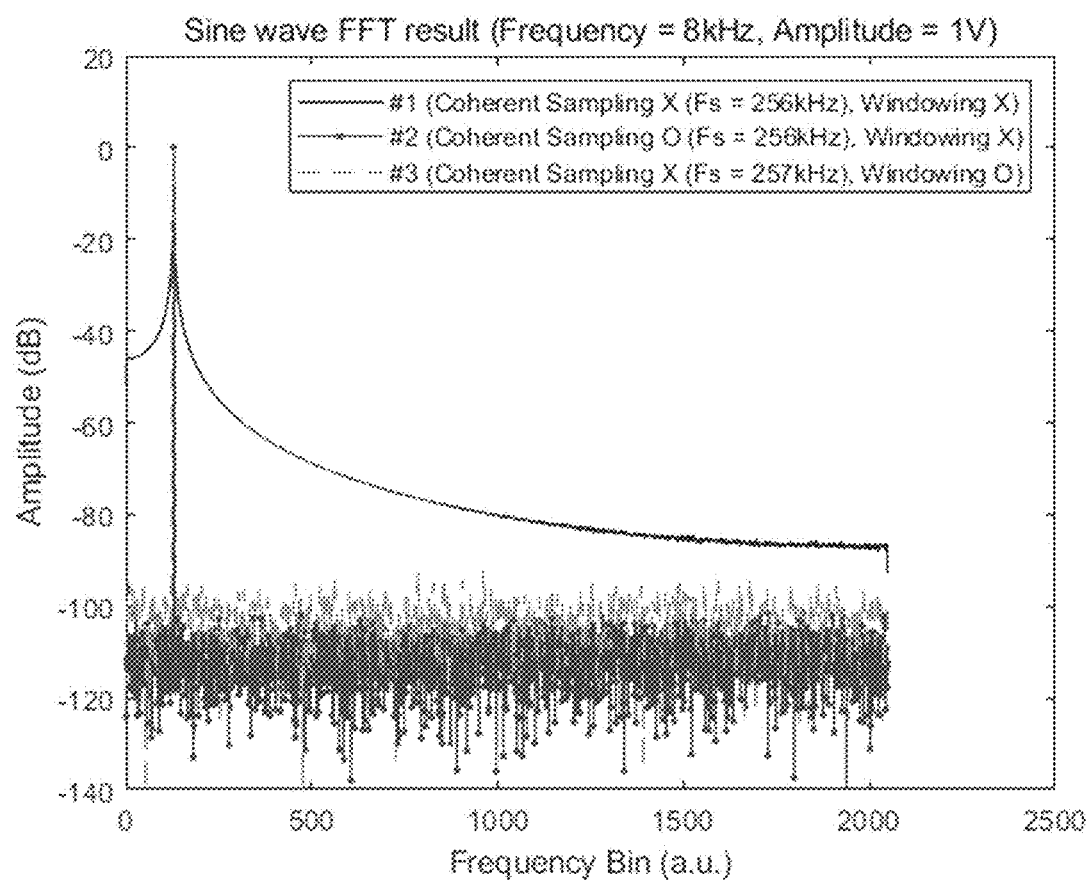

FIGS. 3A and 3B are diagrams illustrating frequency analysis results of the plasma diagnostic circuit 1200 according to some example embodiments by way of example.

As illustrated in FIG. 3A, an 8 kHz sine wave is generated from the signal generator 1220, and 4096 samples may be used for signal analysis. Referring to FIG. 3B, after applying a Fast Fourier Transform (FFT), a result in the frequency domain is illustrated. #1 is the result of not applying the window function under the non-coherent sampling condition, #2 is the result of not applying the window function under the coherent sampling condition, and #3 is the result of applying the window function under the non-coherent sampling conditions.

Compared to a case where no coherent sampling or window function is applied to the plasma diagnostic apparatus 1000 (#1), when various example embodiments are applied (#2 or #3), a peak value may be read with a relatively good signal-to-noise ratio in the band of 8 KHz incoming from plasma or a harmonic frequency, without spectral leakage. As a result, signal detection may be robust even when an electrical signal with a small difference from noise level and/or a perturbation in the plasma such as micro-arcing occurs.

In the plasma diagnostic circuit according to some example embodiments, the signal receiver of the sensor may be expanded and developed by implanting or injecting internal analog and digital circuit elements corresponding to the signal receiver of the sensor into an Application Specific Integrated Chip (ASIC). Therefore, effects such as increased durability of the device due to the reduction of the footprint of the device in the sensor and/or extension of the life of the sensor due to improvement of or optimization of battery power consumption may be expected. In addition, the plasma diagnostic circuit according to some example embodiments is combined with a Smart FOUP system equipped with a sensor storage function, a wireless charging function, and a remote data extraction function, such that multiple facility changes and the like may be managed very efficiently by measuring the Tool-To-Tool Matching (TTTM) and/or Hardware Base Output (HBO) of the facility without going through human hands in the actual mass production line.

On the other hand, the plasma diagnostic circuit 1200 illustrated in FIG. 2 is implemented as a single-type. However, the plasma diagnostic circuit according to some example embodiments need not be limited thereto. The plasma diagnostic circuit according to some example embodiments of various example embodiments may also be implemented as a differential-type.

Figure 4:
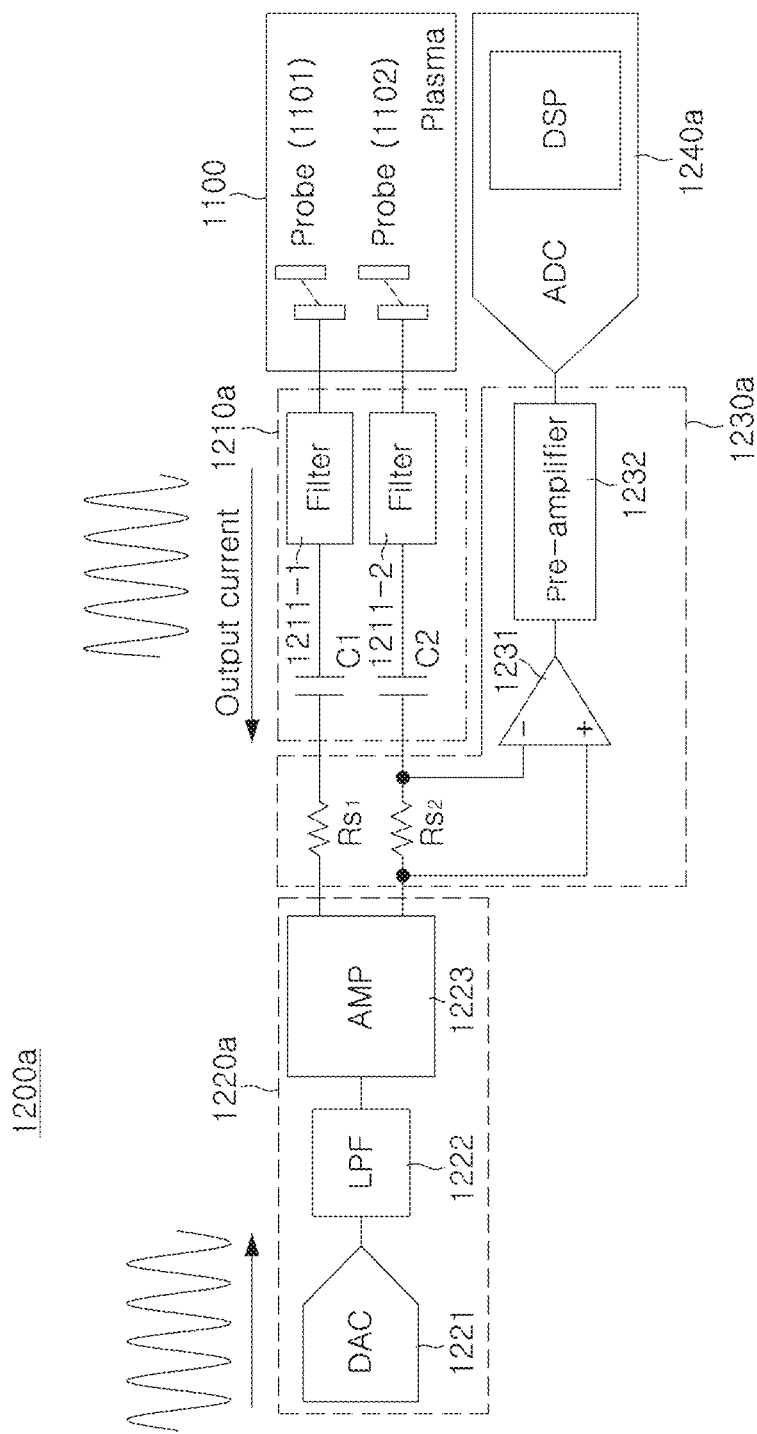
FIG. 4 is a diagram illustrating a plasma diagnostic circuit 1200a according to another embodiment by way of example.

FIG. 4 is a diagram illustrating a plasma diagnostic circuit 1200a according to some example embodiments by way of example. Referring to FIG. 4, the plasma diagnostic circuit 1200a may include a probe circuit 1210a, a signal generator 1220a, a signal reception circuit 1230a, and a signal processing circuit 1240a.

The plasma diagnostic circuit 1200a may have a structure in which the signal generator 1220 and the signal processing circuit 1240 to which a coherent sampling or window function is applied have the same form as that of illustrated in FIG. 2, but has a modified structure of the method of measuring the incoming plasma current when a periodic electrical signal having a phase of 0 degree is applied.

The probe circuit 1210a may include a first capacitor (C1, 1211-1) corresponding to the first signal and a second capacitor (C2, 1211-2) corresponding to the second signal. In this case, the first signal may be a periodic electrical signal having a phase of 0 degrees, and the second signal may be a periodic electrical signal having a phase of 180 degrees. However, it should be understood that the signals according to some example embodiments are not limited thereto.

The first capacitor (C1, 1211-1) may receive a periodic electrical signal having a phase of 0 degree connected between the first resistor (Rs1) and the first probe 1101. The second capacitor (C2, 1211-2) may include a capacitor (C2, 1211-2) receiving a periodic electric signal having a phase of 180 degrees connected between the second resistor (Rs2) and the second probe (1102).

The signal generator 1220a has (+) pole and (−) pole probes 1101 and 1102 in differential form, and may be implemented to apply a periodic electric signal with a phase of 0 degrees and a periodic electric signal with a phase delay of 180 degrees to respective probes. The signal receiver 1230a may be implemented to receive a signal coming from plasma as a differential signal. The signal processing circuit 1240a may be implemented to process an electrical signal corresponding to the received differential signal and store the processed value.

Figure 5:
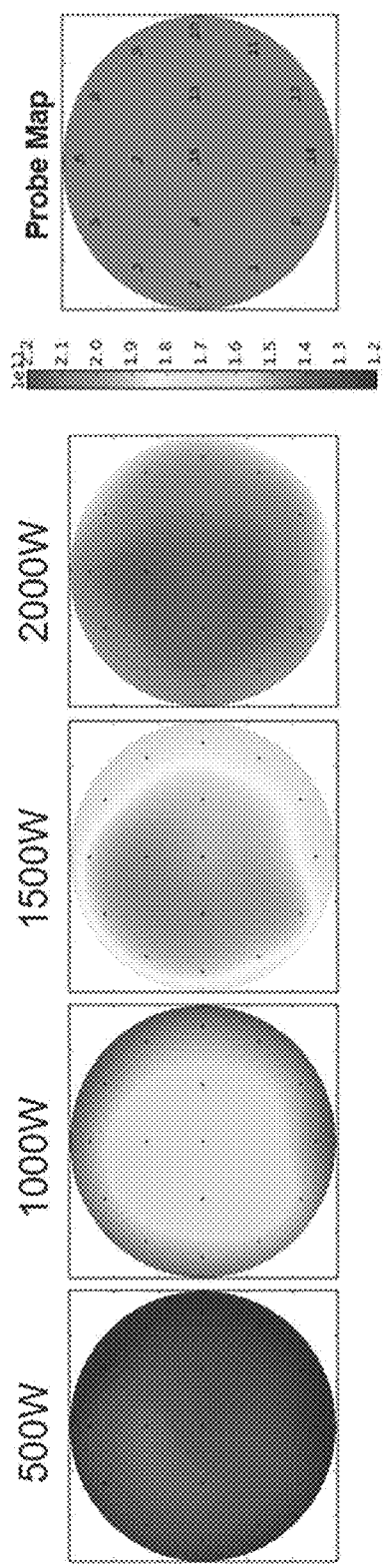
FIG. 5 is a diagram illustrating, as an example, a result of diagnosing a change in argon (Ar) plasma density according to an increase in RF power of an ICP facility to which a plasma diagnostic apparatus according to some example embodiments is applied.
Figure 6:
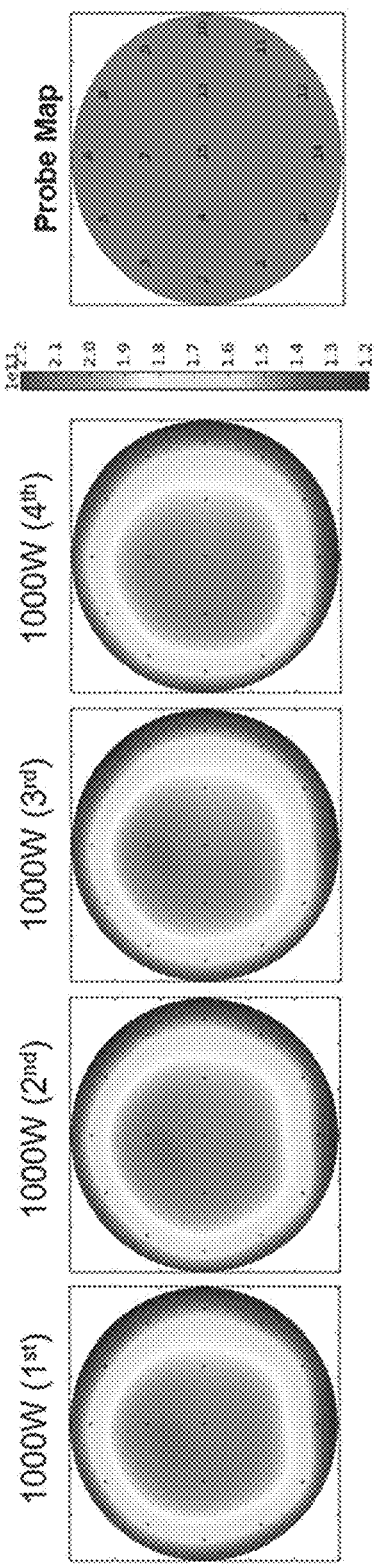
FIG. 6 is a diagram illustrating, as an example, evaluation results of argon (Ar) plasma density diagnosis repeatability of an ICP facility to which a plasma diagnostic apparatus according to some example embodiments is applied.

FIGS. 5 and 6 are diagrams illustrating evaluation results of argon (Ar) plasma density diagnosis repeatability of an inductively coupled plasma (ICP) processing chamber to which a plasma diagnostic apparatus according to some example embodiments is applied. Referring to FIGS. 5 and 6, by using the wireless in situ plasma diagnostic apparatus, the plasma density value measured when generating plasma under the same conditions in an ICP facility may be well and repeatedly measured.

Figure 7:
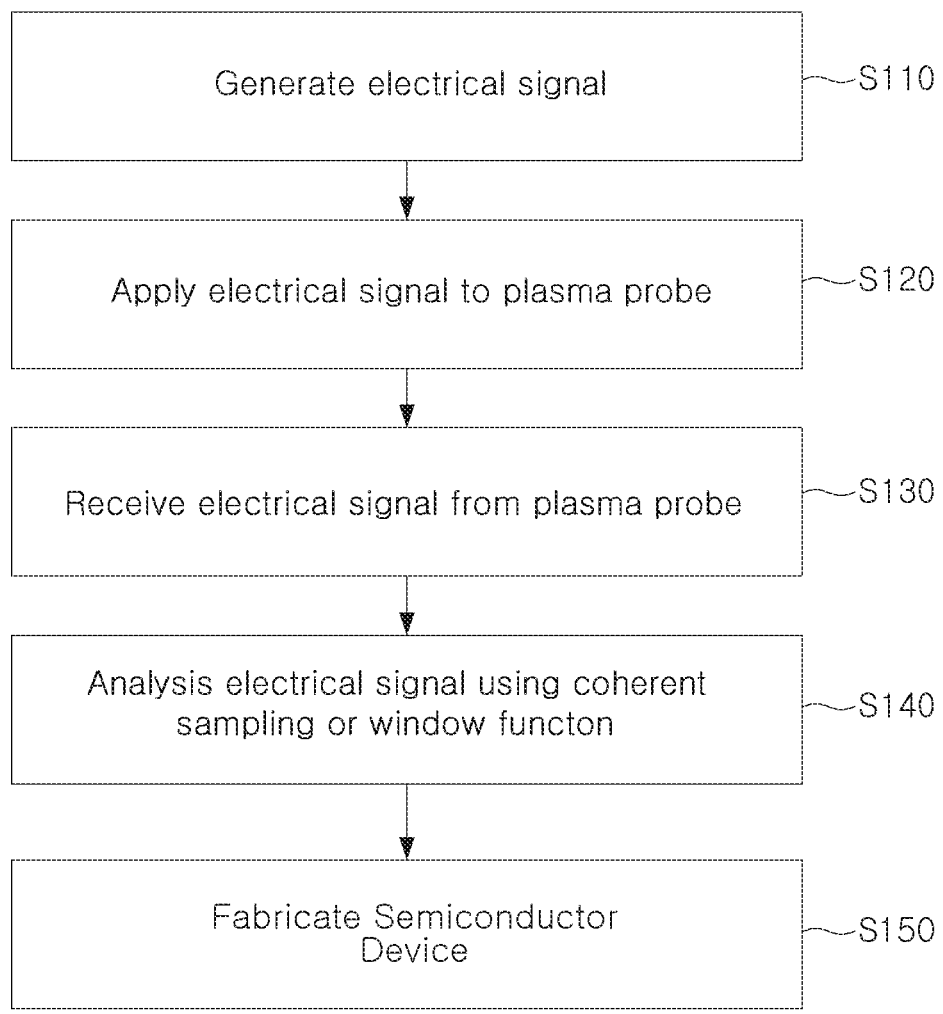
FIG. 7 is a flowchart illustrating a method of operating a plasma diagnostic apparatus according to some example embodiments by way of example.

FIG. 7 is an example flowchart illustrating a method of operating a plasma diagnostic apparatus according to some example embodiments.

Referring to FIGS. 1 to 7, a method of operating the plasma diagnostic apparatus 1000 may proceed as follows. An electrical signal may be periodically generated for in-situ plasma diagnosis (S110). In some example embodiments, the electrical signal may be output by periodically generating an electrical signal using an oscillator, voltage generator, function generator, or digital-to-analog converter, filtering the generated electrical signal, and amplifying the filtered signal. The generated electrical signal may be provided to the plasma probe (S120). The electrical signal may be received from the plasma probe (S130). In some example embodiments, the bandwidth and size may be selectively adjusted to prevent distortion of the sampling signal. In some example embodiments, a signal-to-noise ratio (SNR) may be increased by analogically or digitally applying a function to a signal to be sampled. The received signal may be analyzed using coherent sampling or a window function (S140). In some example embodiments, only the value of the plasma signal determined in advance with respect to the result of analyzing the electrical signal may be selectively stored. A semiconductor device may be fabricated based on the analysis (S150).

In some example embodiments, the amount of frequency computation and/or the storage space may be significantly reduced when diagnosing RF plasma in situ, which may be considered essential to fabricate a thin in-situ plasma sensor to enable auto-loading.

The apparatus described above may be implemented as hardware components, software components, and/or a combination of hardware components and software components. For example, devices and components described in the example embodiment may have a processor, a controller, an arithmetic logic unit (ALU), a digital signal processor, a microcomputer, a field programmable gate array (FPGA), a programmable logic unit (PLU), a microprocessor, or any other device capable of executing and responding to instructions, and may be implemented using one or more general purpose or special purpose computers. The processing device may execute an operating system (OS) and one or more software applications running on the operating system. A processing device may also access, store, manipulate, process, and generate data in response to execution of software. For convenience of understanding, there are cases in which one processing device is used, but those skilled in the art will understand that the processing device includes a plurality of processing elements or a plurality of types of processing elements. For example, a processing device may include a plurality of processors or one processor and a controller. Also, other processing configurations are possible, such as a parallel processor.

Software may include a computer program, code, instructions, or a combination of one or more combinations thereof, and may configure a processing device to operate as required or may independently or collectively command the processing device. Software and/or data may be embodied by any tangible machine, component, physical device, virtual equipment, computer storage medium or device used to be interpreted by, or to provide instructions or data to, a processing device. Software may be distributed on networked computer systems and stored or executed in a distributed manner. Software and data may be stored on one or more computer readable media.

On the other hand, the present inventive concept is applicable to a plasma processing system that measures or monitors various plasma variables.

Figure 8:
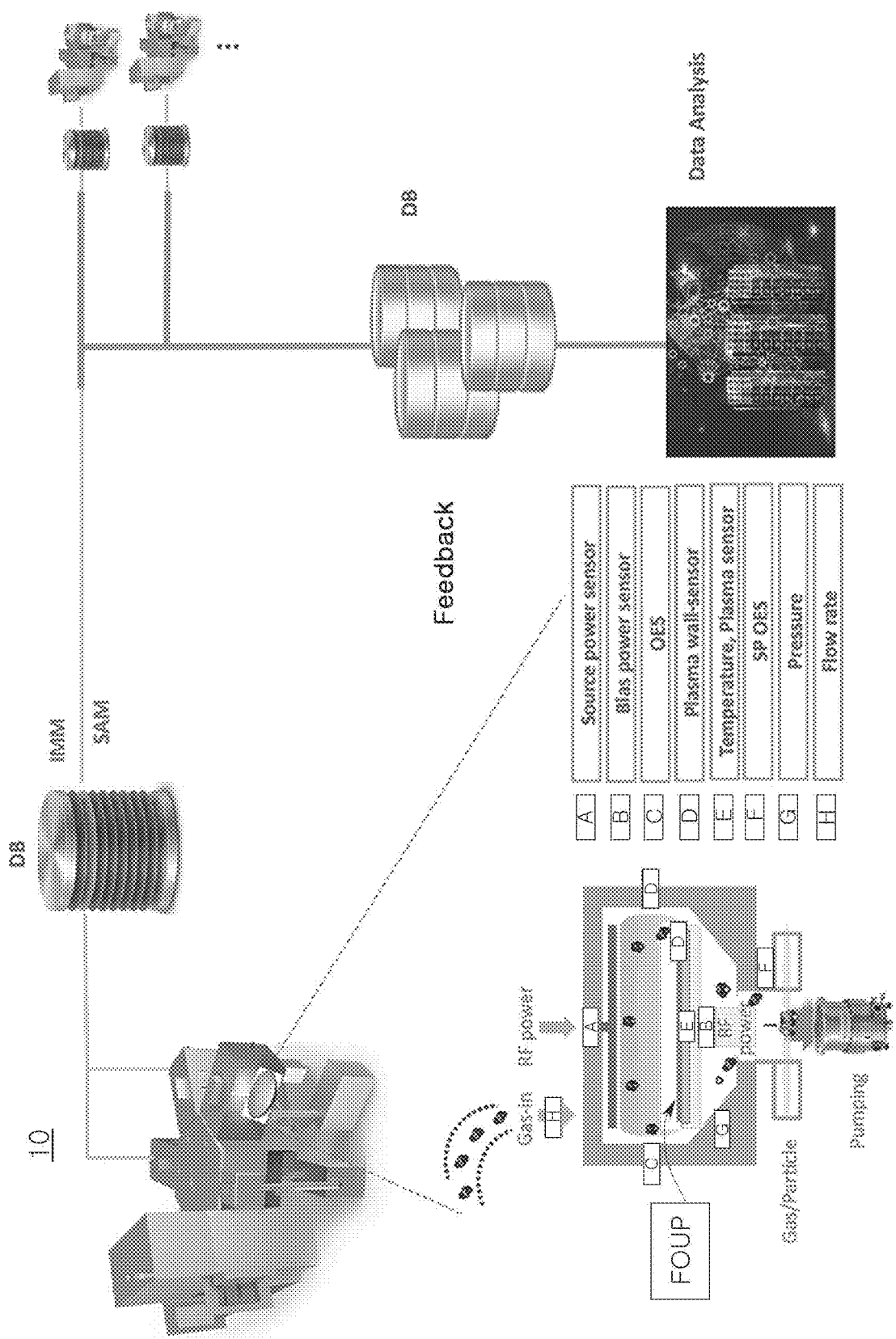
FIG. 8 is a diagram illustrating a plasma processing system 10 according to some example embodiments.

FIG. 8 is a diagram illustrating a plasma processing system 10 according to some example embodiments. Referring to FIG. 8, the plasma processing system 10 performs various measurements and monitoring of plasma variables that directly affect process results, and derives a correlation between Integrated Metrology Module (IMM) and Stand Alone Metrology (SAM) to use virtual metrology and perform fine control of the process. In detail, the plasma processing system 10 according to some example embodiments may monitor the plasma state in-situ by including the plasma diagnostic apparatus E in the form of a wafer. This plasma diagnostic apparatus (E) may be transported from the FOUP.

Various example embodiments may provide an in-situ process plasma diagnostic apparatus capable of auto-loading through a FOUP. In some example embodiments, a battery-based wireless in situ plasma diagnostic apparatus, and the plasma diagnostic apparatus applying coherent sampling and window function, are applied, and there may be applications of thin design based on Si material (thickness<3.0 mm, weight <400 g), low-capacity thin battery (1000 mAh→20 mAh, 50 times or more improvement compared to existing batteries) and low-power IC, on-the-fly frequency calculation being possible inside the sensor by obtaining low power consumption, process plasma inside the chamber that may be diagnosed in-situ (e.g., one or more of electron temperature, ion density, ion flux), significantly reduced calculation burden of existing plasma diagnosis methods through application of coherent sampling and window function, the reduced computational burden in which it is possible to apply thin batteries and low-power ICs and to implement slim sensors (thickness 12 mm→<1.8 mm, 5 times or more improvement compared to existing ones), and thin structure using Si material by circuit simplification and IC miniaturization, thereby being applicable to the actual process chamber.

In the in-situ plasma diagnostic apparatus according to some example embodiments, auto-loading may be possible through facility FOUP, and ESC chucking is possible, enabling plasma diagnosis under the same chucking conditions under which the actual wafer is processed, and due to the same material thereof as the material used in the actual process, it is robust against chamber contamination issues such as particles before and after process diagnosis.

In the in-situ plasma diagnostic apparatus and the operating method thereof according to some example embodiments, coherent sampling and/or a window function is applied to perform plasma diagnosis without the need for high-speed sampling. In some example embodiments, relatively thin batteries and low-power ICs may be applied due to a significant reduction in the amount of computation during plasma diagnosis, and a slim sensor capable of auto-loading through FOUP without facility PM work may be implemented. In example embodiments, by using Si material, the plasma in the facility may be diagnosed without changing the existing actual process recipe and the environment in the chamber, and it is particularly robust against chamber contamination issues.

As set forth above, a plasma diagnostic apparatus and a method of operating the same according to some example embodiments may be implemented by increasing the Signal-to-Noise Ratio (SNR) in the frequency domain when diagnosing plasma to reduce required power consumption and use a relatively longer battery lifespan and may be implemented using a thin and small battery and a low-power device.

The plasma diagnostic apparatus and the operating method thereof according to some example embodiments may increase the sensitivity of plasma diagnosis while significantly reducing the circuit calculation burden of the in-situ plasma diagnosis technique.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While various example embodiments have been illustrated and described above, it will be apparent to those of ordinary skill in the art that modifications and variations could be made without departing from the scope according to some example embodiments as defined by the appended claims. Example embodiments are not necessarily mutually exclusive with one another. For example, some example embodiments may include one or more features described with reference to one or more figures, and may also include one or more other features described with reference to one or more other figures.

What is claimed is:

1. A plasma diagnostic apparatus comprising:
    a substrate having at least one probe;
    a plasma diagnostic circuit mounted on the substrate and configured to diagnose plasma in a chamber with the at least one probe, and to store diagnosis result information;
    a wireless communication circuit mounted on the substrate and configured to wirelessly transmit the diagnosis result information to an external device; and
    a battery mounted on the substrate and configured to supply a power to the plasma diagnostic circuit and to the wireless communication circuit,
    wherein
        a first probe of the at least one probe is configured to be applied with a periodic electrical signal of a first phase,
        a second probe of the at least one probe is configured to be applied with the periodic electrical signal of a second phase, and
        the first phase and the second phase have a phase difference of 180°.

2. The plasma diagnostic apparatus of claim 1, wherein the substrate is implemented as a wafer.

3. The plasma diagnostic apparatus of claim 2, wherein the substrate is implemented with a silicon-based material.

4. The plasma diagnostic apparatus of claim 2, wherein the substrate is implemented to have a thickness of less than 3.0 mm and a weight of less than 400 g.

5. The plasma diagnostic apparatus of claim 1, wherein the plasma diagnostic circuit is configured to perform plasma diagnosis using at least one of coherent sampling or a window function.

6. The plasma diagnostic apparatus of claim 1, wherein the plasma diagnostic circuit includes,
    a probe circuit configured to receive an electrical signal provided from plasma through the at least one probe;
    a signal generator configured to generate the periodic electrical signal and to output the periodic electrical signal to the at least one probe;
    a signal receiver configured to receive the electrical signal from the probe circuit; and
    a signal processing circuit configured to analyze the received electrical signal using at least one of coherent sampling or a window function.

7. The plasma diagnostic apparatus of claim 6, wherein the probe circuit includes,
    a filter configured to mitigate a noise from the chamber; and a capacitor configured to AC-couple with the signal processing circuit.

8. The plasma diagnostic apparatus of claim 6, wherein the probe circuit includes,
a first filter connected to the first probe of the at least one probe;
a second filter connected to the second probe of the at least one probe;
a first capacitor connected to the first filter and configured to receive the periodic electric signal having the first phase from the signal generator; and
a second capacitor connected to the second filter and configured to receive the periodic electrical signal having the second phase from the signal generator.

9. The plasma diagnostic apparatus of claim 6, wherein the signal generator includes,
a digital-to-analog converter configured to periodically generate a signal;
a low-pass filter configured to filter the generated signal of the digital-to-analog converter; and
an amplifier configured to amplify the filtered signal of the low-pass filter.

10. The plasma diagnostic apparatus of claim 6, wherein the signal receiver includes,
a sensing resistor having one end connected to the signal generator and another end connected to the probe circuit;
an operational amplifier configured to sense a voltage difference between both ends of the sensing resistor; and
a pre-amplifier connected between an output terminal of the operational amplifier and the signal processing circuit, configured to selectively adjust a bandwidth to mitigate sampling distortion of the signal processing circuit, and to control a common mode level and signal amplitude of a signal applied to the signal processing circuit.

11. A plasma diagnostic apparatus implemented in a wafer form and configured to perform the following operations:
generating a first electrical signal including a first phase and a second electrical signal including a second phase in a signal generator mounted on a substrate;
applying the generated first electrical signal to a first probe of a plurality of probes and the generated second electrical signal to a second probe of the plurality of probes;
receiving an electrical signal from the plurality of probes in a plasma diagnostic circuit mounted on the substrate; and
analyzing the received electrical signal using at least one of coherent sampling or a window function in the plasma diagnostic circuit mounted on the substrate,
wherein the first phase and the second phase have a phase difference of 180°.

12. The plasma diagnostic apparatus of claim 11, wherein the generating the first electrical signal includes,
periodically generating the first electrical signal using an oscillator, a voltage generator, a function generator, or a digital-to-analog converter;
filtering the generated first electrical signal; and
amplifying the filtered first electrical signal.

13. The plasma diagnostic apparatus of claim 11, wherein the receiving the first electrical signal includes selectively adjusting at least one of a bandwidth and a magnitude of a sampling signal to mitigate distortion of the sampling signal.

14. The plasma diagnostic apparatus of claim 13, further comprising:
increasing a signal-to-noise ratio by analogically and/or digitally applying a function to the sampling signal.

15. The plasma diagnostic apparatus of claim 11, further comprising:
selectively storing only a first plasma signal value with respect to a result of analyzing the electrical signal.

16. A plasma diagnostic apparatus comprising:
a substrate implemented as a wafer;
a plurality of probes on the substrate; and
a plasma diagnostic circuit configured to receive an electrical signal corresponding to plasma of a chamber through each of the plurality of probes and to diagnose the electrical signal through at least one of coherent sampling or a window function,
wherein
at least one first probe among the plurality of probes is configured to be applied with a periodic electrical signal of a first phase,
at least one second probe among the plurality of probes is configured to be applied with the periodic electrical signal of a second phase, and
the first phase and the second phase have a phase difference of 180°.

17. The plasma diagnostic apparatus of claim 16, wherein the substrate is implemented with a silicon material having a thickness of less than 3.0 mm.

18. The plasma diagnostic apparatus of claim 16, wherein the plasma diagnostic circuit includes,
a signal generator configured to generate the periodic electrical signal and to output the periodic electrical signal to the plurality of probes;
a signal receiver configured to receive the electrical signal from the plurality of probes; and
a signal processing circuit configured to analyze the electrical signal using at least one of the coherent sampling or the window function.

19. The plasma diagnostic apparatus of claim 18, further comprising:
a filter connected to each of the plurality of probes; and
a capacitor connected between the filter and the signal receiver.

* * * * *